July 2, 1940.  F. BUDD  2,206,158
PRESSURE GAUGE SIGNAL FOR PNEUMATIC TIRES
Filed Aug. 3, 1938
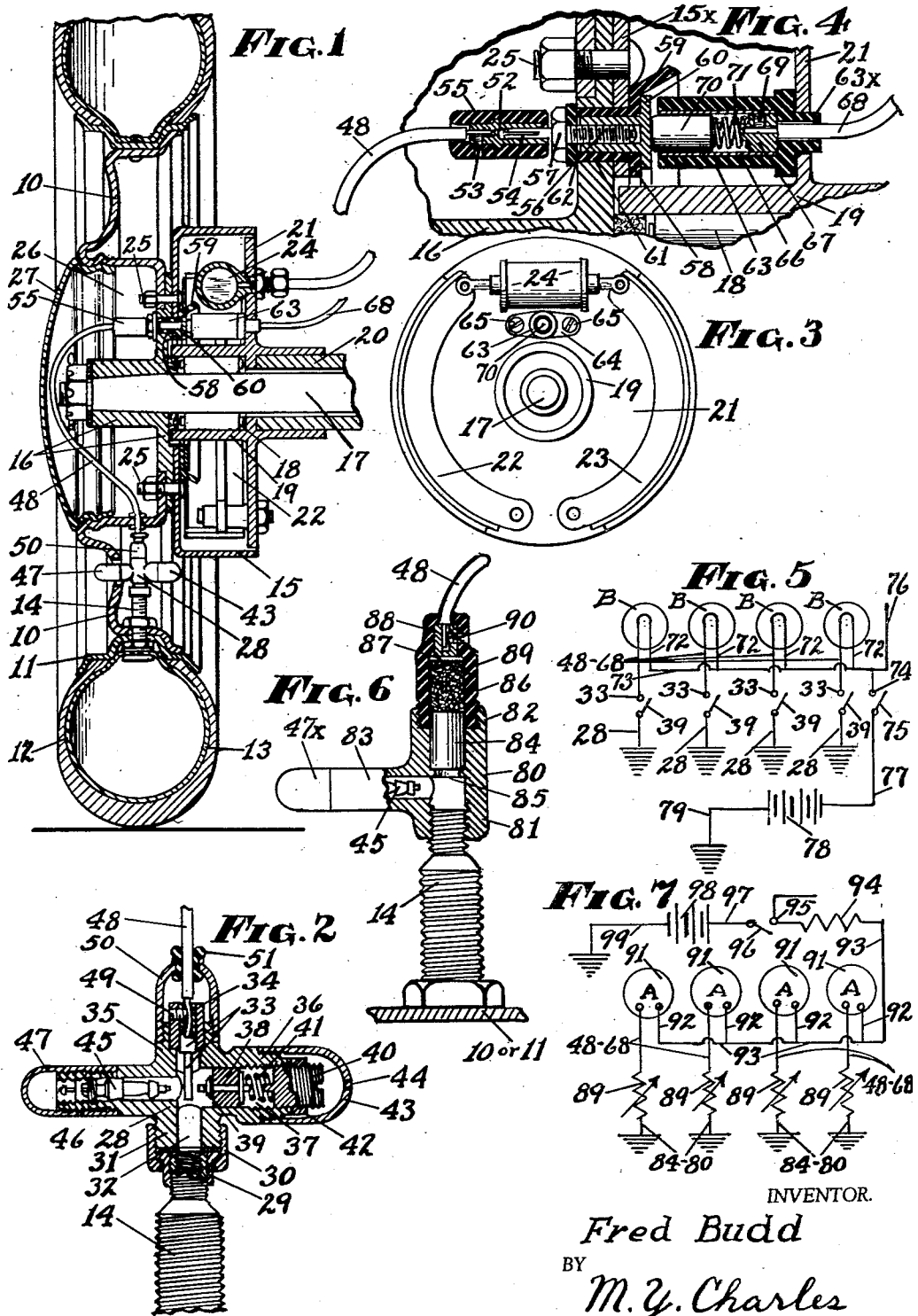
INVENTOR.
Fred Budd
BY
M. Y. Charles
ATTORNEY.

Patented July 2, 1940

2,206,158

UNITED STATES PATENT OFFICE 2,206,158

PRESSURE GAUGE SIGNAL FOR PNEUMATIC TIRES

Fred Budd, Wichita, Kans.

Application August 3, 1938, Serial No. 222,901

2 Claims. (Cl. 200—58)

My invention relates to an improvement in pressure gauge signals, for pneumatic tires on vehicles.

The object of my invention is to provide a device which will register a signal in the vehicle where the driver's attention may be attracted to it.

A further object of my invention is to provide a signal of the kind mentioned which will operate to inform the driver of low air pressure in any one particular tire as he drives along.

Another object is to provide a device of the kind mentioned which will register the amount of air pressure in any one particular tire.

These and other objects will be described as this description progresses.

Now referring to the accompanying drawing, Fig. 1 is a sectional view through a wheel and its mountings, illustrating the application of my improved signal device. Fig. 2 is an enlarged sectional view through the pressure gauge and electrical contact device. Fig. 3 is a face view of the plate carrying the brake shoes and operating device therefor, and illustrating the support of the brush contact device employed in my improved signal system. Fig. 4 is an enlarged detailed sectional view through the brush device and contact ring device employed in transmitting the electric current from the revolving wheel or hub to the stationary brush element. Fig. 5 is a diagram of the electric circuit employed in the device as illustrated in Figs. 1, 2, 3, and 4. Fig. 6 is a detailed sectional view through a carbon or graphite rheostat device that may be employed in the place of the device shown in Fig. 2. Fig. 7 is a wiring diagram such as would be employed when using the device shown in Fig. 6. Similar numerals of reference designate the same parts throughout the several figures of the drawing.

In the drawing is shown the conventional wheel construction and mounting therefor in which the wheel disc is represented at 10, on which is mounted the tire rim 11 in which is mounted the tire 12, in which is positioned the usual air tube 13 that is provided with the usual valve stem 14, through which air is injected into the tube 13 to inflate the tire 12. At 15 is the usual brake drum that is rigidly mounted on the drive shaft 17 that is carried on roller bearings 18, that are carried in a bearing housing 19 that is carried on the axle housing 20. At 21 is a circular plate element formed on the element 19 and functioning as a closure for the brake drum 15 and on which the brake shoes 22 and 23 and the operating device 24 therefor is mounted. At 25 is shown bolts passing through the brake drum plate, hub flange and wheel flange as a means of rigidly attaching the wheel to the hub in the usual manner, the wheel disc being made in such a manner as to provide a cavity 26 which houses the wheel hub and flange 16 and at 27 is the hub cap closing the cavity 26. All the foregoing described parts are commonly found in automobile wheels such as are employed by most of the present day manufacturers, and to these parts I have added and attached my improved signal device which comprises a pressure gauge and electrical contact device which includes a four way casting 28, one leg of which is adapted to be rigidly attached with an air tight joint to the valve stem 14 by any suitable method or device. The device I have shown comprises a flanged element 29 that is threaded on the upper end of the valve stem 14, the flange of which overlaps an inwardly turned flange on a collar element 30, that is threaded on the leg 31 of the four way casting 28 so that the passage 32 joins with the air passage in the valve stem 14. At 33 is an electrical contact point carried in an insulation mounting 34 that is rigidly mounted with an air tight joint in the leg 35 of the four way casting 28 in such a manner that the contact point 33 is held rigid and does not touch any metallic part of the device. In the leg 36 of the casting 28 is formed a cylinder 37 in which is slidably positioned a piston 38 that is provided with a metallic contact element 39 which passes therethrough and is adapted to engage and disengage the contact point 33 as the piston 38 moves forward or backward. At 40 is an adjusting screw that is threaded into the outer end of the housing leg 36, and at 41 is a helical spring that is under pressure between the piston 38 and the screw 40. At 42 is a locknut threaded on the screw 40, and functions to lock the screw 40 in its adjusted position. At 43 is a dust cap that is threaded on the outside of the housing leg 36 to shield the adjusting screw 40 from dust and mud and the like. At 44 is a small hole in the dust cap 43 for the exhaust of air that might tend to build up pressure behind the piston 38. At 45 is an air check valve commonly known as a valve core which has been removed from the valve stem 14 and placed in the leg 46 of the casting 28 in its usual method of mounting. At 47 is a dust cap threaded on the outside of the leg 46 of the casting 28 so as to shield the valve core 45 and passage in which it is mounted from dust and mud and the like. At 48 is shown an insulated wire, one end of which is rigidly connected to the contact element 33 by means of a set screw 49 that engages sideways against the wire to secure an electrical contact between the wire and the contact element 33. At 50 is a dust cap that is threaded on the leg 35 of the casting 38 and houses the insulating element 34 and electrical connection of the wire therein. At 51 is a rubber sleeve which passes through the upper end of the cap 50 and closely fits the wire 48 to form a weather tight joint therebetween. The other end of the wire 48 is rigidly connected to a sleeve element 52 by means of a set screw 53 which engages the end of the wire 48 and rigidly binds it within the sleeve element 52 to form an electrical contact therebetween. The other end of the sleeve element 52 is adapted to slip onto a contact post 54, the end of which is split and slightly spread so as to form a spring electrical contact between the post 54 and the sleeve element 52. The sleeve element 52 is carried in an insulating element 55 which functions to protect the connection of the wire 48 to the sleeve 52 as well as to form an insulating element over the sleeve 52.

The contact post 54 is integrally formed on a screw element 56 that is provided with a nut like element 57 that is integrally formed on and between the screw 56 and the contact post 54.

At 58 is an insulating ring having an inwardly and outwardly directed flange element thereon, the ring element 58 lying against the brake drum flange 15x.

The insulating ring 58 is provided with an outwardly projecting sleeve portion 59 which passes through the brake drum flange 15x and the hub flange on the hub element 16, and functions as an insulation through the brake drum flange and the hub flange.

At 60 is a metallic ring, preferably copper that lies against the insulating ring 58 and is provided with an integrally formed sleeve like element 61 that passes through the insulating sleeve 59 and is internally threaded to receive the bolt 56.

At 62 is an insulation washer positioned around the bolt 56 and functions as an insulation bearing for the bolt head 57 so that the bolt 56 may be screwed tightly into the sleeve 61 and function to rigidly bind and hold the insulation ring 58—59 and contact ring 60 in the position shown in Fig. 4.

This construction minus the contact post 54 may be repeated at various intervals around the circle for the permanent mounting of the assembly as described.

At 63 is a sleeve like element made of insulating material that is provided with ear like elements 64, through which screws 65 pass and thread into the plate 21 as a means of rigidly supporting the element 63, the element 63 being so positioned that its center axis passes through the line of a circle midway between the inside and outside edge of the ring 60, the element 63 is provided with a rearwardly extending sleeve like portion 63x that passes through the plate 21. The sleeve like element 63 is preferably lined with a metallic lining 66, in one end of which is mounted a metallic block 67 in which is rigidly attached one end of a wire 68 by means of a set screw 69 that is threaded in the block 67 and engages the wire 68. It will be understood that the wire 68 is insulated except at the end where it is connected to the block 67.

Slidably mounted in the metallic tubular element 66 is a brush element 70, preferably made of graphite bronze, and at 71 is a helical spring under compression between the metallic block 67 and the brush 70 and functions to push the brush 70 against the ring 60 so as to maintain an electrical contact between the two elements as the ring 60 revolves with the wheel as it turns. The other end of the wire 68 leads to any suitable signal device such as a light, a buzzer or a bell and the like. At 72 is a wire connecting between the signal, (light), and a common feed wire 73 which leads to the open side 74 of the engine ignition switch 75. At 76 is the ignition wire leading to the ignition system of the engine. At 77 is a wire connecting between the hot side of the ignition switch and the battery 78. At 79 is a wire leading from the battery 78 to the ground (frame or metallic part of the chassis of the car).

In Fig. 6 is shown a modified form of the device and in Fig. 7 is shown a wiring diagram for the electric circuit and equipment to be used in connection with the device shown in Fig. 6. The device shown in Fig. 6 is a pressure operated carbon or graphite rheostat and comprises a T-shaped casting 80, the legs 81, 82, and 83 of which are bored so as to make them hollow. The leg 81, being threaded so that it may be screwed onto the upper end of the valve stem 14 so as to form an airtight joint therebetween. In the leg 83 is the valve core 45 which has been removed from the valve stem 14 and placed in the leg 83 in the usual manner so as to retain the air pressure in the tube 13, and the valve stem 14. In the leg 82 of the casting 80 is formed a cylinder in which is closely fit a metallic piston 84 which rests on a shoulder 85 intermediate the cylinder and the bore in the leg 81 and above the passage in the leg 83. At 86 is a cylindrical housing made of electrical insulating material and in the upper interior portion thereof is a plate 87 integrally formed on an upwardly extending stud 88, which is mounted in the upper portion of the element 86. At 89 is a resistance material (granular carbon or graphite or carbon discs), interposed between the metallic disc 87 and the upper end of the piston 84, so that air pressure within the tube 13 and valve stem 14 will urge the piston 84 upwardly so as to exert pressure on the material 89 which will transmit an amount of electrical current which is directly proportional to the pressure to which the material 89 is subjected. At 48 is a wire, one end of which is connected to the stud 88 and is rigidly bound thereto by means of a set screw 90, that is threaded into the stud 88 as will be readily understood. The wire 48 leads into the cavity 26 of the wheel into the slip connection as illustrated in Fig. 4 to transmit current to the wire 68 as previously described, the wire 48—68 leading to an ampere meter 91 which has been recalibrated to read pounds pressure instead of amperes. At 92 is a wire leading to a common feed wire 93 which leads to one end of a resistance 94 which will govern a suitable maximum amount of electric current that will be permitted to flow through any or all of the ampere meters 91. There being four of the meters 91, one for each of the variable resistance 89 which is connected, one to each of the valve stems on all four wheels of the vehicle. The other end of the resistance 94 is connected to the open side of the ignition switch 96. At 97 is a wire connecting between the closed side of the ignition switch and the battery 98 and at 99 is a wire leading from the battery to the ground (the chassis or any metallic part connected therewith).

The operation of the device shown in the Figs. 1, 2, 3, 4 and 5 is as follows: When there is no air in the tube 13 and valve stem 14 or the air pressure therein is extremely low the spring 37 will move the piston 38 toward the contact element 39 in such a degree that the end of the contact element 39 will contact the element 33 and close the circuit through its respective signal or light B, and if the ignition switch 75 be closed that particular light will become lighted thereby signaling that the air pressure in its respective tire is below normal or below such a point as would be safe to run on the tire. Now the dust cap 47 may be removed from the leg 46 of the element 28, whereupon a pressure of air may be injected through the passage in the leg 46 and into the valve stem 14 and tube 30 in the usual manner and when a sufficient amount of air pressure has been placed therein the pressure will force the piston 38 backwards against the pressure of the spring 41 and break the contact of the element 39 with the contact point 33 whereupon its respective light B will be extinguished which indicates there is sufficient pressure of air in its respective tire. The adjusting screw 40 may be screwed in or out so as to increase or decrease the pressure of the spring 41, thereby the device may be adjusted to make and break contact at any desired air pressure.

The operation of the device shown in Figs. 3, 4, 6 and 7 is as follows: Each valve stem on the machine is equipped with a variable resistance device as shown in Fig. 6, and each device is provided with a respective ampere meter 91 that would be positioned on the instrument panel of the car, and considering that the ignition switch 96 is closed an electric current would flow through each of the meters 91 and would cause each of them to register the amount of current flowing therethrough. Each of the meters are recalibrated to read pounds pressure instead of amperes. The meters are registering amperes which are converted into terms of pounds pressure, and inasmuch as the current for each of these meters must flow through its respective variable resistance 89 which is governed by the air pressure against the piston 84, the meter will register the number of pounds of air pressure in its respective tire. Therefore by reading the meters the operator of the car will immediately know the condition of the air pressure in any one of the tires of the machine.

In view of the fact that the rubbing of the brake bands on the brake drum in the process of braking will produce worn particles to fall from the brake linings or brake drum onto any of the stationary parts within the brake drum it is obvious that these particles might fall on that portion of the brush 70 that is intermediate the ring 60 and the sleeve like housing 63, and cause the movement of the brush 70 to become sluggish in its slidable mounting or might even break the contact of the brush 70 with the ring 60 whereupon the signal would fail to operate. In order to avoid this trouble I have provided the flange 59 on the ring 56 which will function as a shield that overlaps the end of the housing 63 so that as these particles of worn material fall within the brake drum they will light on the surface of the flange 59 and if they continue to travel after lighting thereon they will be guided away from the end of the housing 63, and as the wheel revolves these particles will be thrown by centrifugal force along the slanting outside surface of the flange 59 and toward the plate 21 where they will eventually come to rest at places other than on the end of the sleeve 63 adjacent the ring 60.

In cases of punctures, etc., it is the general practice to remove the hub cap 27 and take the nuts off the bolt 25, whereupon the wheel and tire may be removed from the hub 16 and replaced with another one therefore in order to permit this change I have provided the slip connection that is in the housing 55 so that it may be readily disconnected from the hub element so that the wheel may be removed in the usual manner, and when the wheel is replaced with another wheel the slip connection 55 may be slipped on the post 54 the same as shown in Figs. 1 and 4, whereupon the signal device will function the same on the new tire as it did on the original tire.

Such modifications of my invention may be employed as lie within the scope of the appended claims without departing from the spirit and intention of my invention. Now having fully described my invention, I claim:

1. In an air pressure indicating device for pneumatic tires; a cruciform casing, the first leg of said casing having means thereon whereby the leg may be attached to the valve stem of a pneumatic tire so that the cavity in said leg is in air receiving relationship to said valve stem; the cavity in the second leg of said casing having an air check valve therein for the purpose of entering air through the cruciform casing and the said valve stem into a pneumatic tire; the cavity in the third leg of said casing having an insulating element rigidly mounted therein and supporting an electrical contact point that extends beyond the center axis of the cavities in the second and fourth legs of the cruciform casing, the fourth leg of the cruciform casing being a cylinder in which is slidably positioned a piston having an electrical contact point thereon that is adapted to engage and disengage the first said contact point upon the movements of the piston in the cylinder, said cylinder having an adjustable head, and a compression spring therein intermediate the head, and the piston so as to urge the movement of the piston and electrical contact point thereon toward the first said contact point and against the air pressure in said cavities for making or breaking an electrical circuit.

2. In an air pressure indicating device for pneumatic tires, as defined in claim 1; and an air tight removable cap on the second leg of the cruciform casing, and a dust cap on the fourth leg of the cruciform casing to provide accessibility for tire inflation purposes, and spring pressure adjustment against said piston.

FRED BUDD.